(12) United States Patent       (10) Patent No.: US 8,347,134 B2
Uchida                           (45) Date of Patent: Jan. 1, 2013

(54) POWER CONTROL SYSTEM, POWER CONTROL APPARATUS, POWER CONTROL METHOD AND STORAGE MEDIUM

(75) Inventor: Kohei Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 829 days.

(21) Appl. No.: 12/324,051

(22) Filed: Nov. 26, 2008

(65) Prior Publication Data
US 2009/0138734 A1    May 28, 2009

(30) Foreign Application Priority Data
Nov. 26, 2007 (JP) .................. 2007-304360

(51) Int. Cl.
*G06F 1/00* (2006.01)
(52) U.S. Cl. ...................................... 713/323
(58) Field of Classification Search ........... 713/300–340
See application file for complete search history.

(56) References Cited

U.S. PATENT DOCUMENTS

| | | | | |
|---|---|---|---|---|
| 5,907,859 | A * | 5/1999 | Shimada et al. | 711/112 |
| 6,986,069 | B2 * | 1/2006 | Oehler et al. | 713/320 |
| 7,093,147 | B2 * | 8/2006 | Farkas et al. | 713/320 |
| 7,155,622 | B2 * | 12/2006 | Mancey et al. | 713/324 |
| 7,281,146 | B2 * | 10/2007 | Nalawadi et al. | 713/320 |
| 7,401,236 | B2 * | 7/2008 | Adachi | 713/300 |
| 7,444,526 | B2 * | 10/2008 | Felter et al. | 713/300 |
| 7,536,573 | B2 * | 5/2009 | Schumacher et al. | 713/320 |
| 7,584,369 | B2 * | 9/2009 | Capps et al. | 713/300 |
| 7,669,071 | B2 * | 2/2010 | Cochran et al. | 713/340 |
| 7,844,838 | B2 * | 11/2010 | Naffziger et al. | 713/300 |
| 2005/0174678 | A1 * | 8/2005 | Zayas et al. | 360/73.03 |
| 2005/0187727 | A1 * | 8/2005 | Weik et al. | 702/61 |
| 2006/0053316 | A1 * | 3/2006 | Yamazaki et al. | 713/300 |
| 2006/0149978 | A1 * | 7/2006 | Randall et al. | 713/300 |
| 2007/0083779 | A1 * | 4/2007 | Misaka et al. | 713/300 |
| 2009/0019202 | A1 * | 1/2009 | Shetty et al. | 710/116 |
| 2009/0217059 | A1 * | 8/2009 | Gervais et al. | 713/300 |

FOREIGN PATENT DOCUMENTS
JP    2006-011793    1/2006

* cited by examiner

*Primary Examiner* — Paul R Myers
(74) *Attorney, Agent, or Firm* — Dickstein Shapiro LLP

(57) ABSTRACT

A power control system for a network system in which a plurality of devices are connected over a network can adequately distribute limited power according to the operational state of each device while keeping a high reliability. A device operating in normal mode broadcasts a power accommodation request when the power of the device is insufficient. Upon reception of the power accommodation request, devices operating in low-power mode send accommodatable power values to the requesting device, and sends a low-power mode fixation notification indicating that operational mode is fixed to the low-power mode to a controller. Upon reception of the low-power mode fixation notification from the notifying devices, the controller sets a job assignment ratio to the notifying devices lower than that of the requesting device.

16 Claims, 12 Drawing Sheets

FIG. 4

PERFORMANCE TABLE STORAGE UNIT(21)

| DEVICE | MODE | PERFORMANCE |
|---|---|---|
| 1A | LOW-POWER MODE | 50% |
| | THROTTLING MODE | 60% |
| 1B | LOW-POWER MODE | 80% |
| | THROTTLING MODE | 80% |
| 1C | LOW-POWER MODE | 30% |
| | THROTTLING MODE | 70% |
| 1D | LOW-POWER MODE | 90% |
| | THROTTLING MODE | 90% |

FIG. 12

PERFORMANCE TABLE STORAGE UNIT(21a)

| DEVICE | MODE | PERFORMANCE |
|---|---|---|
| 1Aa | LOW-POWER MODE(LEVEL 1) | 90% |
| | LOW-POWER MODE(LEVEL 2) | 60% |
| | LOW-POWER MODE(LEVEL 3) | 30% |
| | THROTTLING MODE | 50% |
| 1Ba | LOW-POWER MODE(LEVEL 1) | 80% |
| | LOW-POWER MODE(LEVEL 2) | 50% |
| | LOW-POWER MODE(LEVEL 3) | 20% |
| | THROTTLING MODE | 50% |
| ⋮ | ⋮ | ⋮ |

POWER CONTROL SYSTEM, POWER CONTROL APPARATUS, POWER CONTROL METHOD AND STORAGE MEDIUM

BACKGROUND OF THE INVENTION

1. Field of the Invention

The present invention relates to a power control technique for a network system in which a plurality of devices, such as computers, are connected over a network.

2. Description of the Related Art

Recently, as the performance of computers is enhanced, the consumed power becomes greater. In a machine room where a plurality of computers are sited, an increase in consumed power is becoming a significant problem. In general, at the time of designing a machine room, the maximum suppliable power value (the sum of the values of power that can be supplied to the individual computers) is set to the sum of the rated power values of the individual computers. However, actually, each computer does not consistently need a rated power value, it is rare for all of the computers to use the rated power value at a time. Therefore, setting the maximum suppliable power value to the sum of the rated power values of the individual computers brings about a problem such that the power equipment in the machine room becomes excessive.

To achieve the problem, Unexamined Japanese Patent Application KOKAI Publication No. 2006-11793 (hereinafter called "Patent Document 1") discloses the following technique. The Patent Document 1 discloses the technique of providing a specific computer with a master management module which processes a power increase request sent from each computer to adequately distribute the limited power according to the operational state of each computer in a computer system including a plurality of computers. Each computer sends a power increase request to the master management module when determining that consumed power needs to be increased based on the operational state of the computer itself. Upon reception of the power increase request, the master management module determines whether the sum of the consumed powers of the individual computers exceeds the maximum suppliable power value if the consumed power of the requesting computer is increased. When the master management module determines that the sum of the consumed powers of the individual computers does not exceed the maximum suppliable power value, the master management module sends an increase enable notification to the requesting computer. When the master management module determines that the sum of the consumed powers of the individual computers exceeds the maximum suppliable power value, on the other hand, the master management module sends an increase disable notification to the requesting computer. When receiving the increase enable notification, the requesting computer increases the consumed power of the computer itself. When receiving the increase disable notification, the requesting computer sends a power increase request to the master management module again after a predetermined time. Apparently, the technique disclosed in Patent Document 1 can adequately distribute the limited power according to the operational state of each computer.

However, the technique disclosed in Patent Document 1 allows a single computer having the master management module mounted therein to intensively process the power increase request. When the computer fails, therefore, power control cannot be carried out at all, resulting in a low reliability. While multiplexing of computers having the master management modules mounted therein can overcome the above problem, the configuration becomes complex.

SUMMARY OF THE INVENTION

Accordingly, it is an object of the present invention to enable adequate distribution of a limited power according to the operational states of individual devices while keeping a high reliability.

To achieve the object, according to one aspect of the invention, there is provided a power control system for a network system in which a plurality of devices are connected over a network, each of the plurality of devices including:

a mode changeover unit that operates the local device in one of modes which is specified by a mode changeover instruction, the modes including a low-power mode, a normal mode whose maximum consumed power value is greater than a maximum consumed power value in the low-power mode, and a high-power mode whose maximum consumed power value is greater than a maximum consumed power value in the normal mode; and a mode controller that sends a power accommodation request to other devices in case of determining that power becomes insufficient when the local device is operating in the normal mode, sends a mode changeover instruction instructing an operation in the high-power mode to the mode changeover unit in case of determining that sum of accommodatable power values sent from the other devices in response to the power accommodation request is equal to or greater than a needed power value needed for transition to the high-power mode, and sends a difference between the maximum consumed power value in the normal mode and the maximum consumed power value in the low-power mode as an accommodatable power value to a sender device which has sent the power accommodation request in case of receiving the power accommodation request when the local device is operating in the low-power mode.

According to another aspect of the invention, there is provided a power control apparatus provided in each of a plurality of devices which are connected over a network, including:

a mode changeover unit that operates the local device in one of modes which is specified by a mode changeover instruction, the modes including a low-power mode, a normal mode whose maximum consumed power value is greater than a maximum consumed power value in the low-power mode, and a high-power mode whose maximum consumed power value is greater than a maximum consumed power value in the normal mode; and a mode controller that sends a power accommodation request to other devices in case of determining that power becomes insufficient when the local device is operating in the normal mode, sends a mode changeover instruction instructing an operation in the high-power mode to the mode changeover unit in case of determining that a total of accommodatable power values sent from the other devices in response to the power accommodation request is equal to or greater than a needed power value needed for transition to the high-power mode, and sends a difference between the maximum consumed power value in the normal mode and the maximum consumed power value in the low-power mode as an accommodatable power value to a sender device which has sent the power accommodation request in case of receiving the power accommodation request when the local device is operating in the low-power mode.

According to a further aspect of the invention, there is provided a power control method for a network system in which a plurality of devices are connected over a network, including:

a mode changeover step of allowing each of the plurality of devices to operate the local device in one of modes which is specified by a mode changeover instruction, the modes including a low-power mode, a normal mode whose maximum consumed power value is greater than a maximum consumed power value in the low-power mode, and a high-power mode whose maximum consumed power value is greater than a maximum consumed power value in the normal mode; and a mode control step of allowing each of the plurality of devices to send a power accommodation request to other devices in case of determining that power becomes insufficient when the local device is operating in the normal mode, send a mode changeover instruction instructing an operation in the high-power mode to the mode changeover unit in case of determining that a total of accommodatable power values sent from the other devices in response to the power accommodation request is equal to or greater than a needed power value needed for transition to the high-power mode, and send a difference between the maximum consumed power value in the normal mode and the maximum consumed power value in the low-power mode as an accommodatable power value to a sender device which has sent the power accommodation request in case of receiving the power accommodation request when the local device is operating in the low-power mode.

According to a still further aspect of the invention, there is provided a computer-readable storage medium storing a program for allowing a computer to realize a power control apparatus provided in each of a plurality of devices which are connected over a network, the computer being allowed to function as:

a mode changeover unit that operates the local device in one of modes which is specified by a mode changeover instruction, the modes including a low-power mode, a normal mode whose maximum consumed power value is greater than a maximum consumed power value in the low-power mode, and a high-power mode whose maximum consumed power value is greater than a maximum consumed power value in the normal mode; and a mode controller that sends a power accommodation request to other devices in case of determining that power becomes insufficient when the local device is operating in the normal mode, sends a mode changeover instruction instructing an operation in the high-power mode to the mode changeover unit in case of determining that a total of accommodatable power values sent from the other devices in response to the power accommodation request is equal to or greater than a needed power value needed for transition to the high-power mode, and sends a difference between the maximum consumed power value in the normal mode and the maximum consumed power value in the low-power mode as an accommodatable power value to a sender device which has sent the power accommodation request in case of receiving the power accommodation request when the local device is operating in the low-power mode.

BRIEF DESCRIPTION OF THE DRAWINGS

FIG. 4 is a diagram exemplarily showing one example of contents to be stored in a performance table storage unit of a controller equipped in the power control system according to the first embodiment;

FIG. 12 is a diagram exemplarily showing one example of contents to be stored in a performance table storage unit of a controller equipped in the power control system according to the second embodiment.

DETAILED DESCRIPTION OF THE PREFERRED EMBODIMENTS

The best mode for carrying out the present invention will be described below with reference to the accompanying drawings.

Configuration of First Embodiment of the Invention

Figure 1:
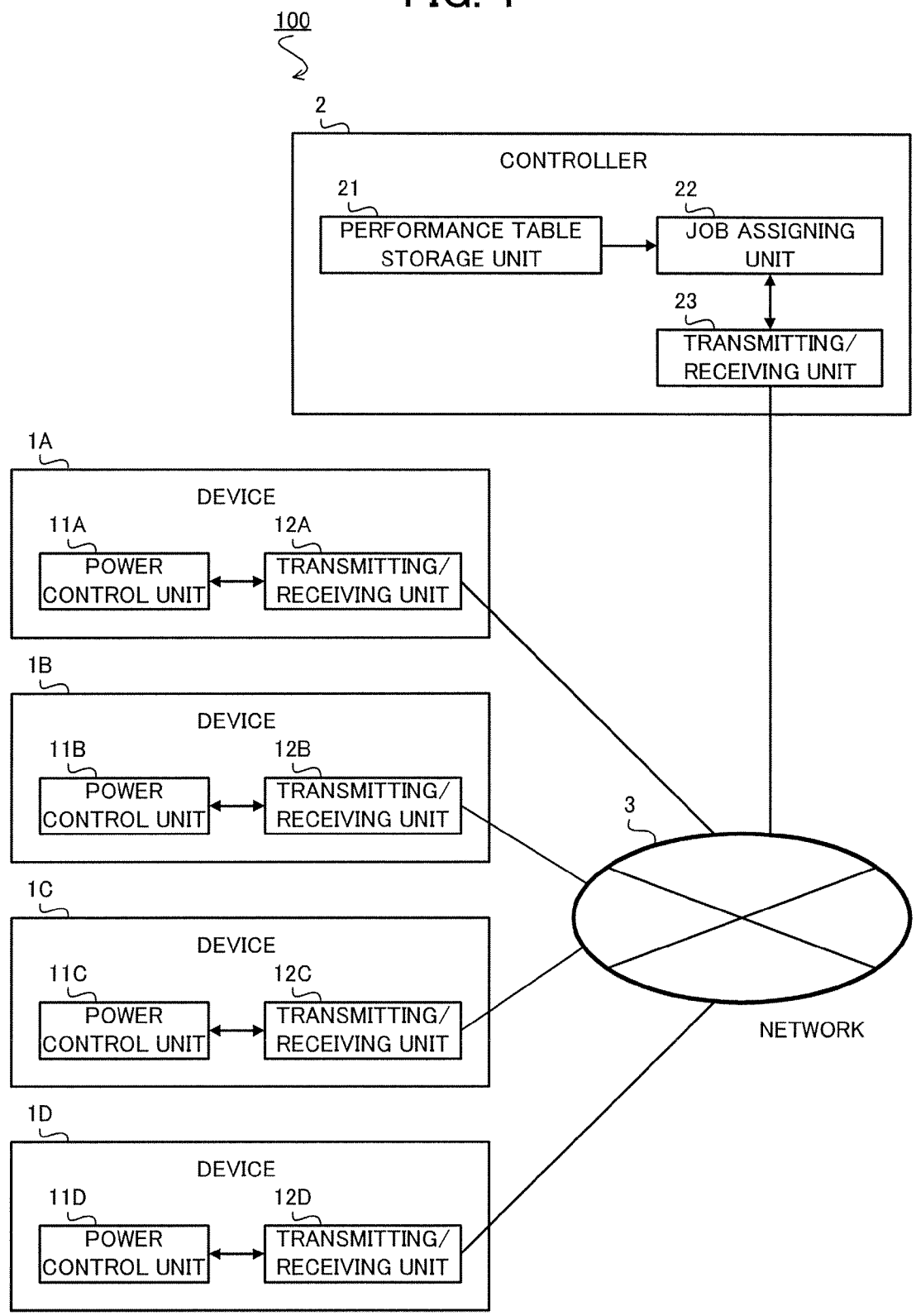
FIG. 1 is a block diagram exemplifying one example of the configuration of a power control system according to a first embodiment.

FIG. 1 is a block diagram exemplifying one example of the configuration of a power control system according to the first embodiment. As shown in FIG. 1, a power control system 100 has a plurality of devices 1A to 1D, and a controller 2, which are connected to one another over a network 3.

[Configuration of Devices 1A to 1D]

The devices 1A to 1D are, for example, computers which execute jobs dispatched from the controller 2. The devices 1A to 1D respectively have power control units 11A to 11D, and transmitting/receiving units 12A to 12D.

The transmitting/receiving units 12A to 12D have functions of transmitting and receiving data over the network 3.

Each of the power control units 11A to 11D has a function of changing the operational mode of the respective one of the devices 1A to 1D to one of a low-power mode, a normal mode, a high-power mode and a throttling mode. The power control units 11A to 11D change the operational mode at the timing, for example, when receiving an accommodation requests from other devices, at the timing when the amount of the loads of the local devices 1A to 1D are changed, or at the timing when the amount of the consumed powers of the local devices 1A to 1D are changed. The power control units 11A to 11D change the operational mode based on, for example, the amount of the loads of the local devices 1A to 1D and the amount of the consumed powers of the local devices 1A to 1D.

Figure 2:
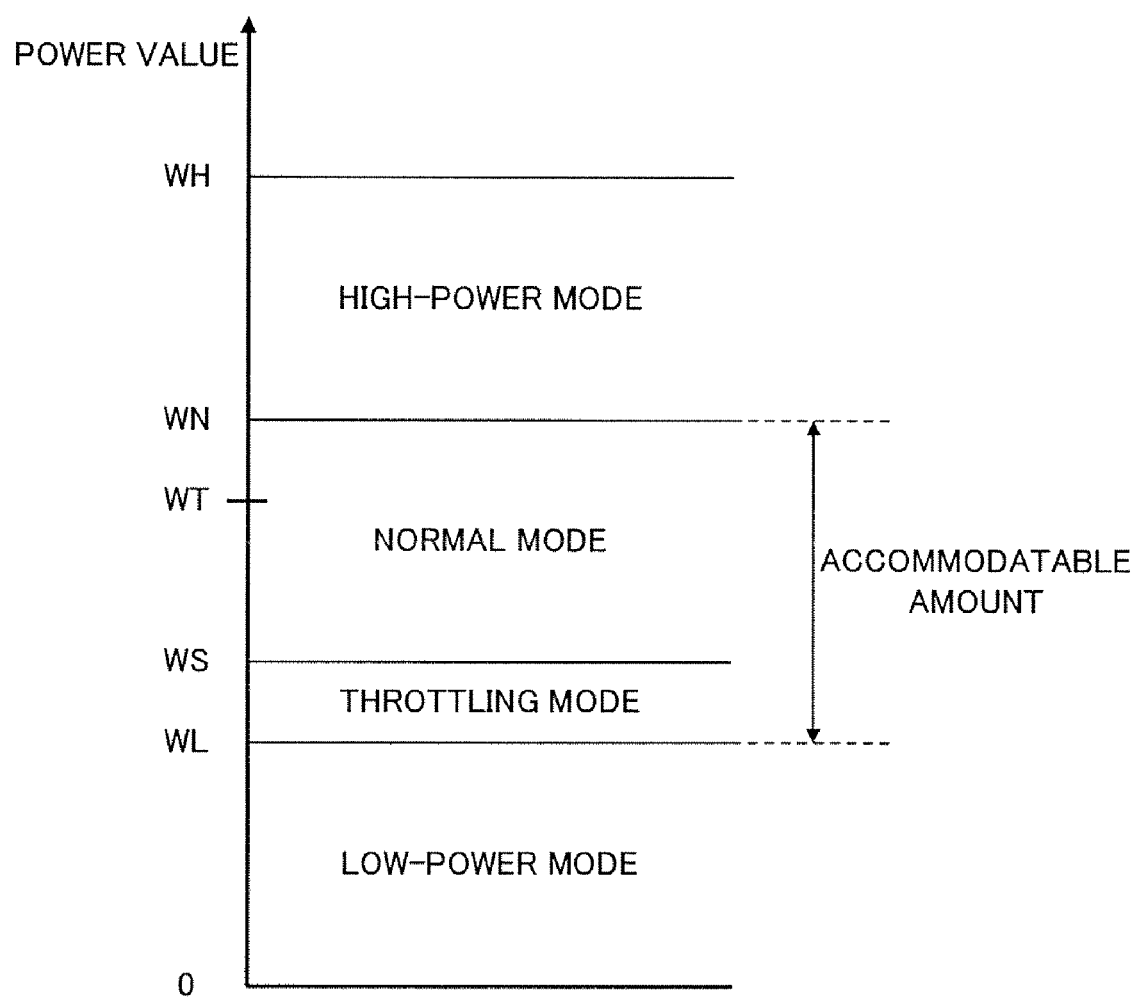
FIG. 2 is a diagram showing the relationship between an operational mode and a mode maximum consumed power value in the power control system according to the first embodiment.

The mode maximum consumed power value which is a maximum consumed power value available differs from one operational mode to another. As shown in FIG. 2, a mode maximum consumed power value WH for the high-power mode is the largest, followed by a mode maximum consumed power value WN for the normal mode, a mode maximum consumed power value WS for the throttling mode, and a mode maximum consumed power value WL for the low-power mode in order. The sum of the mode maximum consumed power values WN of the individual devices 1A to 1D in normal mode is set to match with a maximum suppliable power value Wmax (the total of the values of powers that can be supplied to the individual computers in the power control system) suppliable to the individual devices 1A to 1D. While $WS \leq WL$ is set in the example shown in FIG. 2, $WS \leq WL$ may be set.

Figure 3:
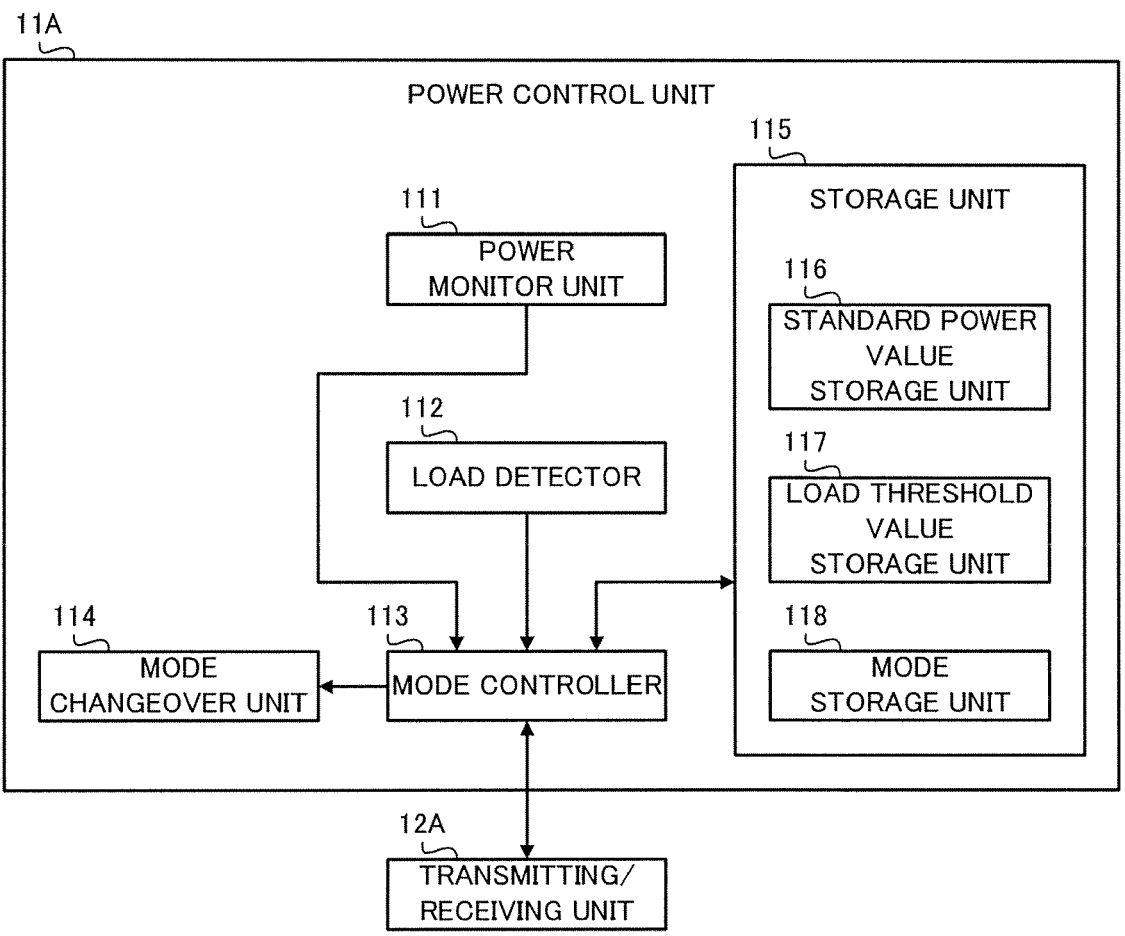
FIG. 3 is a diagram exemplifying the configuration of a power control unit of a device equipped in the power control system according to the first embodiment.

FIG. 3 is a block diagram exemplifying the configuration of the power control unit 11A, which includes a power monitor unit 111, a load detector 112, a mode controller 113, a mode changeover unit 114, and a storage unit 115. The other power control units 11B to 11D have the same configurations.

The power monitor unit 111 has a function of measuring the consumed power of the local device 1A. The load detector 112 has a function of detecting the amount of the load in the local device 1A (e.g., the CPU operating ratio).

The storage unit 115 has a standard power value storage unit 116, a load threshold value storage unit 117 and a mode storage unit 118.

A standard power value WT of the local device 11A is stored in the standard power value storage unit 116. As shown in FIG. 2, the standard power value WT is slightly smaller than the mode maximum consumed power value WN in normal mode, and greater than the mode maximum consumed power value WL, WS in low-power mode or throttling mode.

A threshold value TH1 which is used to change between the low-power mode and the normal mode is stored in the load threshold value storage unit 117.

Mode information indicating the operational mode of the local device 1A at the present time is stored in the mode storage unit 118.

The mode changeover unit 114 has a function of changing the operational mode of the local device 1A according to a mode changeover instruction from the mode controller 113. The changeover of the operational mode is achieved by, for example, changing the operational speed (operation clock) of the CPU (not shown) in the local device 1A.

The mode controller 113 has functions given in the following paragraphs (1) to (9).

(1) When the local device 1A is operating in low-power mode (when the mode information stored in the mode storage unit 118 indicates the low-power mode), the mode controller 113 repeats a process of determining whether the load of the local device 1A detected by the load detector 112 is equal to or greater than the threshold value TH1 stored in the load threshold value storage unit 117. When it is determined that the load of the local device 1A is equal to or greater than the threshold value TH1, the mode controller 113 instructs the mode changeover unit 114 to change the operational mode to the normal mode, and change the mode information stored in the mode storage unit 118 to one indicating the normal mode.

(2) When the local device 1A is operating in normal mode, the mode controller 113 repeats a process of determining whether the load of the local device 1A is less than the threshold value TH1. When it is determined that the load of the local device 1A is less than the threshold value TH1, the mode controller 113 instructs the mode changeover unit 114 to change the operational mode to the low-power mode, and change the mode information stored in the mode storage unit 118 to one indicating the low-power mode.

(3) Based on the result of measurement performed by the power monitor unit 111, the mode controller 113 determines whether the consumed power of the local device 1A is equal to or greater than the standard power value WT stored in the standard power value storage unit 116. When it is determined that the consumed power of the local device 1A is equal to or greater than the standard power value WT, the mode controller 113 starts measuring the time that the consumed power value continuously becomes equal to or greater than the standard power value WT (hereinafter called "overtime"). When the overtime becomes equal to or greater than a predetermined time T1, the mode controller 113 broadcasts a power accommodation request.

(4) After broadcasting the power accommodation request, the mode controller 113 starts measuring a standby time (given time T2). During the measurement, the mode controller 113 repeats a process of determining whether the sum of the accommodatable power values indicated by individual accommodatable power value notifications received during the measurement is equal to or greater than an increase in the power value needed to change the operational mode of the local device 1A from the normal mode to the high-power mode (hereinafter called "needed power value"). When it is determined that the sum of the accommodatable power values is equal to or greater than the needed power value, the mode controller 113 executes the following operations (a) to (c). (a) The mode controller 113 instructs the mode changeover unit 114 to change the operational mode to the high-power mode. (b) The mode controller 113 sends a high-power mode change notification indicating that the operational mode is changed to the high-power mode to the device notifying the accommodatable power value notification and the controller 2. (c) The mode controller 113 changes the mode information in the mode storage unit 118 to the high-power mode.

(5) When the sum of the accommodatable power values is less than the needed power value even after the standby time elapses, the mode controller 113 executes the following operations (d) to (f). (d) The mode controller 113 instructs the mode changeover unit 114 to change the operational mode to the throttling mode. (e) The mode controller 113 sends a throttling mode change notification indicating that the operational mode is changed to the throttling mode to the controller 2. (f) The mode controller 113 changes the mode information in the mode storage unit 118 to the throttling mode.

(6) When receiving the power accommodation request while the local device 1A is operating in low-power mode, the mode controller 113 executes the following operations (g) to (i). (g) The mode controller 113 sends the accommodatable power value notification indicating the power value accommodatable in the local device 1A to the requesting device. (h) The mode controller 113 changes the mode information in the mode storage unit 118 to one indicating the fixation of the low-power mode. (i) The mode controller 113 sends the controller 2 a low-power mode fixation notification indicating that the operational mode of the local device 1A is fixed to the low-power mode. Note that when the mode information stored in the mode storage unit 118 indicates the fixation of the low-power mode, the mode controller 113 does not output a change instruction to the mode changeover unit 114 even if the load of the local device 1A becomes equal to or greater than the threshold value TH1.

(7) In a case where the high-power mode change notification cannot be received even if a given time T3 (longer than the given time T2) is elapsed, after the operational mode of the local device 1A is fixed to the low-power mode, the mode controller 113 releases the fixation of the low-power mode by changing the mode information in the mode storage unit 118 to the low-power mode, and sends a low-power mode fixation release notification indicating the release of the fixation of the low-power mode to the controller 2.

(8) When the load becomes smaller and the use power of the local device 1A which is measured by the power monitor unit 111 becomes less than the standard power value WT while the local device 1A is operating in high-power mode, the mode controller 113 executes the following operations (j) to (l). (j) The mode controller 113 changes the mode information in the mode storage unit 118 to one indicating the normal mode. (k) The mode controller 113 instructs the mode changeover unit 114 to change the operational mode to the normal mode. (l) The mode controller 113 sends the controller 2 a normal mode change notification indicating that the operational mode is changed to the normal mode.

(9) When the power value measured by the power monitor unit 111 continuously becomes less than the standard power value WT over a given time T4 while the local device 1A is operating in throttling mode, the mode controller 113 executes the following operations (m) to (o). (m) The mode controller 113 changes the mode information in the mode storage unit 118 to one indicating the normal mode. (n) The mode controller 113 instructs the mode changeover unit 114 to change the operational mode to the normal mode. (o) The mode controller 113 sends a normal mode change notification to the controller 2.

The power control unit 11A having the foregoing functions (1) to (9) can be realized by a CPU (computer), in which case, for example, the following procedures should be taken. A disk, a semiconductor memory or another recording medium recording a program for allowing a computer to function as the power control unit 11A is prepared, and the computer is let to read the program. The computer controls its own operation according to the read program to realize the load detector 112, the mode controller 113 and the mode changeover unit 114 on the local computer.

[Configuration of Controller 2]

Next, the configuration of the controller 2 will be described.

As shown in FIG. 1, the controller 2 has a performance table storage unit 21, a job assigning unit 22 and a transmitting/receiving unit 23.

The transmitting/receiving unit 23 has functions of transmitting and receiving data over the network 3.

The performance table storage unit 21 stores the performances of the individual devices 1A to 1D in low-power mode and in throttling mode in the form of relative values to the 100% performance in normal mode. FIG. 4 is a diagram exemplifying contents stored in the performance table storage unit 21. The rows relating to the device 1A in the example shown in FIG. 4 indicate that the performances in low-power mode and in throttling mode are respectively 50% and 60% of the performance of the device 1A in normal mode. Although the performances of the individual devices 1A to 1D in low-power mode and in throttling mode are represented by relative values to the performance in normal mode in the embodiment, they may be represented by absolute values.

The job assigning unit 22 has functions given in the following paragraphs (11) and (12).

(11) When the devices 1A to 1D include neither a device whose operational mode is fixed to the low-power mode nor a device operating in throttling mode, the job assigning unit 22 evenly dispatches jobs to the individual devices 1A to 1D in round robin fashion, for example.

(12) When the devices 1A to 1D include a device whose operational mode is fixed to the low-power mode or a device operating in throttling mode, the job assigning unit 22 reduces the ratio of assigning jobs to those devices according to the performances stored in the performance table storage unit 21.

The job assigning unit 22 can be realized by a CPU (computer), in which case, for example, the following procedures should be taken. A disk, a semiconductor memory or another recording medium recording a program for allowing a computer to function as the job assigning unit 22 is prepared, and the computer is let to read the program. The computer controls its own operation according to the read program to realize the job assigning unit 22 on the local computer.

Description of Operation of First Embodiment

The operation of the embodiment will be elaborated next.
[Operations of Devices 1A to 1D]

First, the operations of the devices 1A to 1D will be described referring a state transition chart in FIG. 5. Because the operations of the devices 1A to 1D are identical, the operation of the device 1A will be described by way of example. The mode controller 113 in the device 1A, when activated, instructs the mode changeover unit 114 to operate in normal mode, and writes a mode information indicating the normal mode into the mode storage unit 118. Accordingly, the mode changeover unit 114 operates the local device 1A in normal mode by setting the operation clock of the CPU (not shown) in the local device 1A, for example, to one corresponding to the normal mode.

Figure 5:
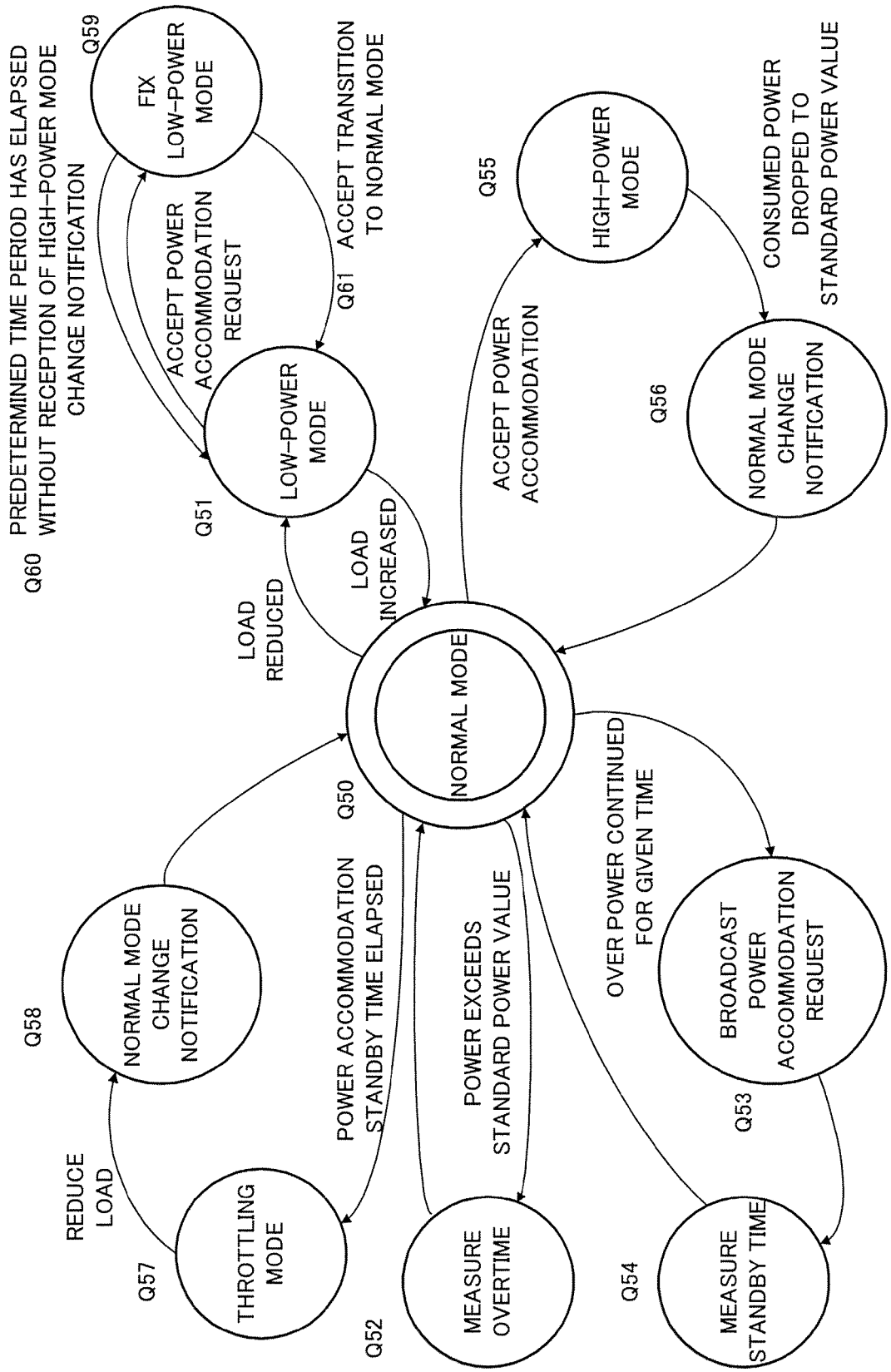
FIG. 5 is a diagram showing one example of a state transition chart of devices equipped in the power control system according to the first embodiment.

The mode controller 113 repeats a process of determining whether the load of the local device 1A detected by the load detector 112 is less than the threshold value TH1 stored in the load threshold value storage unit 117 with the local device 1A operating in the normal mode (Q50 in FIG. 5). When determining that the load of the local device 1A is less than the threshold value TH1, the mode controller 113 instructs the mode changeover unit 114 to change the operational mode to the low-power mode.

Accordingly, the mode changeover unit 114 operates the local device 1A in low-power mode by, for example, changing the operation clock of the CPU to one corresponding to the low-power mode (Q51).

The mode controller 113 also repeats a process of determining whether the load of the local device 1A detected by the load detector 112 is equal to or greater than the threshold value TH1 with the local device 1A operating in low-power mode (Q51). When determining that the load of the local device 1A is equal to or greater than the threshold value TH1, the mode controller 113 instructs the mode changeover unit 114 to change the operational mode to the normal mode. Accordingly, the mode changeover unit 114 changes the operational mode of the local device 1A to the normal mode, and operates the local device 1A in the normal mode (Q50).

The mode controller 113 also repeats a process of determining whether the consumed power value of the local device 1A measured by the power monitor unit 111 is equal to or greater than the standard power value WT stored in the standard power value storage unit 116 with the local device 1A operating in normal mode (Q50). When determining that the consumed power value of the local device 1A is equal to or greater than the standard power value WT, the mode controller 113 starts measuring the overtime (Q52). Then, upon detection that the overtime is equal to or greater than the predetermined time T1, the mode controller 113 broadcasts a power accommodation request onto the network 3 via the transmitting/receiving unit 12A to request the other devices 1B to 1D which have extra power to accommodate power (Q53). After broadcasting the power accommodation request, the mode controller 113 starts measuring the standby time (given time T2) (Q54).

Every time the accommodatable power value notification is sent from other device while measuring the standby time, the mode controller 113 integrates an accommodatable power value Wf indicated by the accommodatable power value notification, and compares the integrated value with a power value needed to change the operational mode of the local device 1A to the high-power mode from the normal mode (needed power value Wneed). When detecting that the integrated value of the accommodatable power value Wf is equal to or greater than the needed power value Wneed, the mode controller 113 instructs the mode changeover unit 114 to change the operational mode to the high-power mode, and sends a high-power mode change notification indicating that the local device 1A is changed to the high-power mode to the device which has sent the accommodatable power value notification and the controller 2. The mode changeover unit 114 changes the operational mode of the local device 1A to the high-power mode according to the instruction (Q55).

The needed power value Wneed and the accommodatable power value Wf are respectively represented by the following equations (1) and (2). WH is the mode maximum consumed power value in high-power mode, WN is the mode maximum consumed power value in normal mode, and WL is the mode maximum consumed power value in low-power mode.

$$Wneed = WH - WN \quad (1)$$

$$Wf = WN - WL \quad (2)$$

The mode controller 113 repeats a process of determining whether the consumed power value of the local device 1A measured by the power monitor unit 111 is less than the standard power value WT continuously for the predetermined time T4 or longer after transition to the high-power mode. When determining that the consumed power value of the local device 1A is less than the standard power value WT continuously for the predetermined time T4 or longer, the mode controller 113 instructs the mode changeover unit 114 to change the operational mode to the normal mode, and sends a normal mode change notification indicating that the local device 1A is changed to the normal mode to the device which has sent the accommodatable power value notification and the controller 2 (Q56). The mode changeover unit 114 changes the operational mode of the local device 1A to the normal mode according to the instruction (Q50).

On the other hand, in a case where the integrated value of the accommodatable power value Wf is still less than the needed power value Wneed even when the standby time becomes the predetermined time T2, the mode controller 113 executes the following process. The mode controller 113 changes the mode information in the mode storage unit 118 to one indicating the throttling mode, instructs the mode changeover unit 114 to change the operational mode to the throttling mode, and sends a throttling mode change notification indicating that the local device 1A is changed to the throttling mode to the controller 2. The mode changeover unit 114 changes the operational mode of the local device 1A to the throttling mode according to the instruction (Q57).

After transition to the throttling mode, the mode controller 113 repeats a process of determining whether the consumed power value of the local device 1A measured by the power monitor unit 111 is less than the standard power value WT continuously for the given time T4 due to the reduction in the load of the local device 1A. When determining that the consumed power value of the local device 1A is less than the standard power value WT continuously for the given time T4, the mode controller 113 changes the mode information stored in the mode storage unit 118 to one indicating the normal mode, instructs the mode changeover unit 114 to change the operational mode of the local device 1A to the normal mode, and sends the normal mode change notification to the controller 2 (Q58). The mode changeover unit 114 changes the operational mode of the local device 1A to the normal mode according to the instruction (Q50).

The mode controller 113 accepts the power accommodation request from other device with the local device 1A operating in low-power mode (Q51). When receiving the power accommodation request from other device, the mode controller 113 fixes the operational mode of the local device 1A to the low-power mode by changing the mode information stored in the mode storage unit 118 to the low-power mode fixation, and sends a low-power mode fixation notification indicating that the operational mode of the local device 1A is fixed to the low-power mode to the controller 2 (Q59). Then, the mode controller 113 starts measuring the given time T3, and, when the high-power mode change notification is not sent from the device to which power is to be accommodated (device which has sent the power accommodation request) before the given time T3 elapses, the mode controller 113 changes the operational mode of the local device 1A to the low-power mode by changing the mode information in the mode storage unit 118 to one indicating the low-power mode (Q51), and sends the low-power mode fixation release notification to the controller 2 (Q60). When receiving the normal mode change notification from the device to which power is to be accommodated (Q61) with the operational mode of the local device 1A fixed to the low-power mode (Q59), the mode controller 113 changes the operational mode of the local device 1A to the low-power mode by changing the mode information in the mode storage unit 118 to one indicating the low-power mode (Q51).

Figure 6:
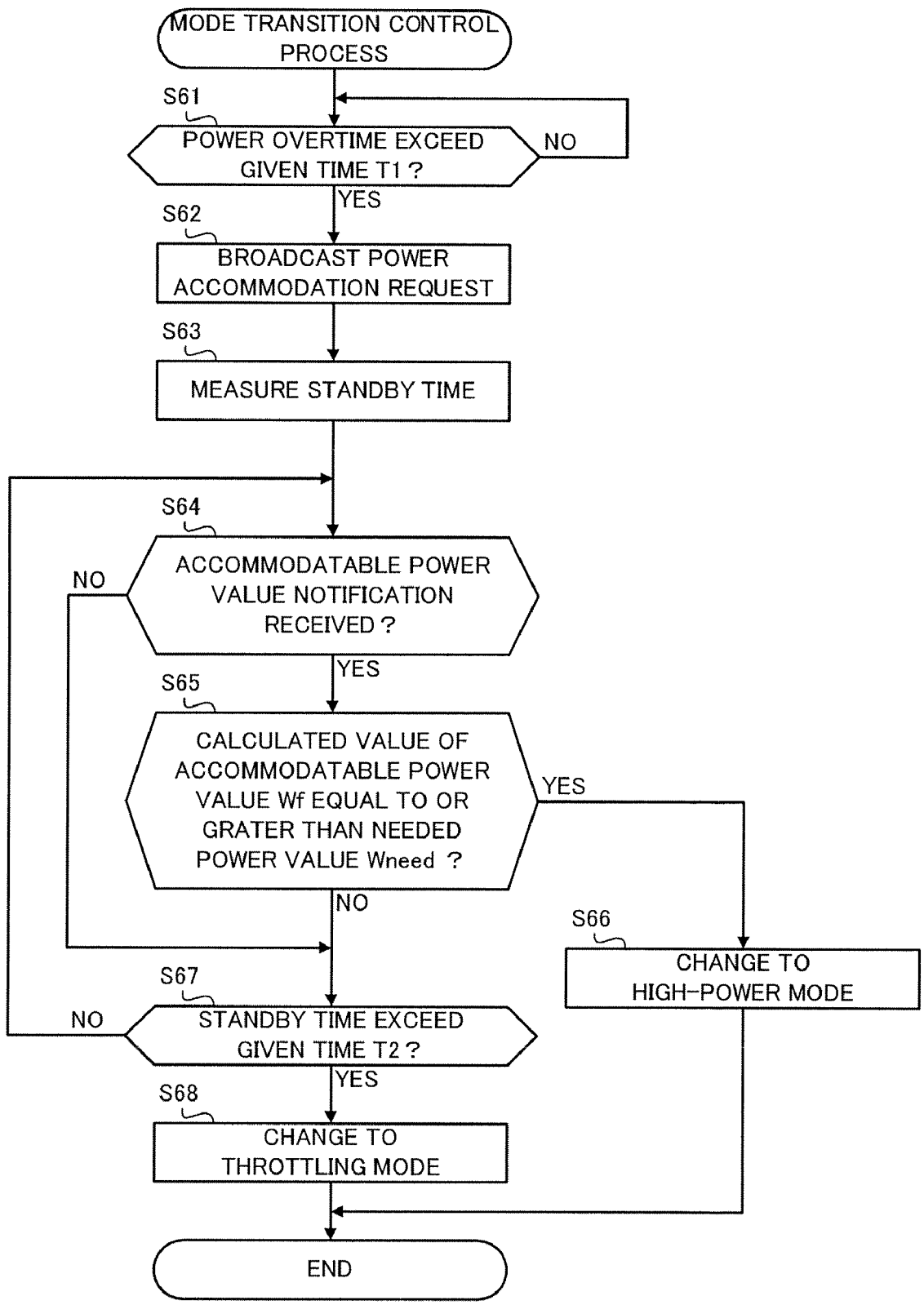
FIG. 6 is a flowchart illustrating one example of a mode transition control process for changing a device equipped in the power control system according to the first embodiment from a normal mode to a high-power mode or to a throttling mode.

Next, referring to FIG. 6, a description will be given of a mode transition control process for changing the device 1A from the normal mode (Q50) to the high-power mode (Q55) or the throttling mode (Q57). The operational mode of the device 1A is assumed to be the normal mode (Q50) in the following description.

The mode controller 113 in the device 1A (hereinafter simply called "mode controller 113" in the description of the mode transition control process) determines whether the consumed power of the local device 1A measured by the power monitor unit 111 is equal to or greater than the standard power value WT continuously for the given time T1 or longer (step S61). When determining that the consumed power of the local device 1A is equal to or greater than the standard power value WT continuously for the given time T1 or longer (step S61: YES), the mode controller 113 broadcasts the power accommodation request (step S62). When determining that the consumed power of the local device 1A is not equal to or greater than the standard power value WT continuously for the given time T1 or longer (step S61: NO), the mode controller 113 executes again the process of determining whether the consumed power of the local device 1A is equal to or greater than the standard power value WT continuously for the given time T1 or longer (step S61).

Thereafter, the mode controller 113 starts measuring the standby time (given time T2) (step S63). Then, the mode controller 113 determines whether the accommodatable power value notification has been received from other device (step S64). When determining that the accommodatable power value notification has been received from other device (step S64: YES), the mode controller 113 integrates an accommodatable power value Wf indicated by the accommodatable power value notification, and determines whether the integrated value is equal to or greater than the needed power value Wneed of the local device 1A (step S65). When determining that the integrated value is equal to or greater than the needed power value Wneed of the local device 1A (step S65: YES), the mode controller 113 changes the mode information stored in the mode storage unit 118 to one indicating the high-power mode, instructs the mode changeover unit 114 to change the operational mode to the high-power mode, and sends the high-power mode change notification to the device which has sent the accommodatable power value notification and the controller 2 (step S66).

When determining that the accommodatable power value notification has not been received from other device yet (step S64: NO), or when determining that the integrated value is not equal to or greater than the needed power value Wneed of the local device 1A (step S65: NO), on the other hand, the mode controller 113 determines whether the standby time has exceeded the given time T2 (step S67). When determining that the standby time has not exceeded the given time T2 (step S67: NO), the mode controller 113 returns the process to the process of determining whether the accommodatable power value notification has been already received from another device yet (step S64). When determining that the standby time has exceeded the given time T2 (step S67: YES), on the other hand, the mode controller 113 changes the mode information in the mode storage unit 118 to one indicating the throttling mode, instructs the mode changeover unit 114 to change the operational mode to the throttling mode, and sends the throttling mode change notification to the controller 2 (step S68). When transition to the high-power mode (step S66) or transition to the throttling mode (step S68) is completed, the mode controller 113 terminates the mode transition control process.

[Operation of Controller 2]

Figure 7:
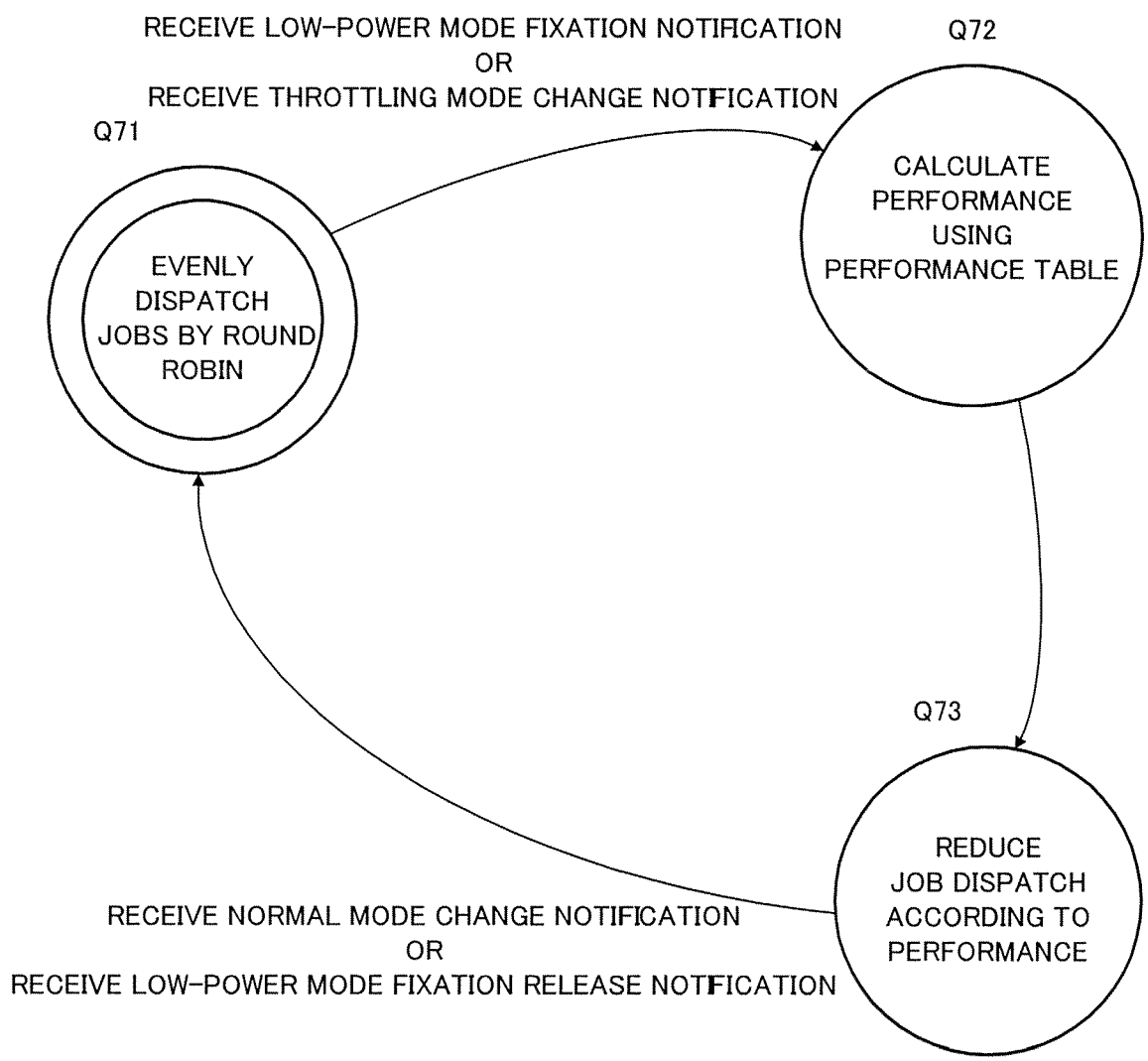
FIG. 7 is a diagram showing one example of a state transition chart of the controller equipped in the power control system according to the first embodiment.

Next, the operation of the controller 2 will be described referring to a state transition chart in FIG. 7.

When the devices 1A to 1D include neither a device whose operational mode is fixed to the low-power mode nor a device operating in throttling mode, the job assigning unit 22 in the controller 2 evenly dispatches jobs to the individual devices 1A to 1D in round robin fashion (Q71).

When receiving the low-power mode fixation notification or the throttling mode change notification with jobs being evenly dispatched to the individual devices 1A to 1D (Q71), the job assigning unit 22 refers to the performance table storage unit 21 to acquire the performance of the notifying device (Q72), and reduces the job assignment to this device according to the acquired performance (Q73). A description will be given of a case where contents stored in the performance table storage unit 21 are what is shown in FIG. 4. When receiving the low-power mode fixation notification from the device 1B, for example, the job assigning unit 22 reduces the job assignment to the device 1B for the performance of the device 1B in low-power mode is 80%, and changes the job assignment ratio (job dispatching ratio) to the individual devices 1A to 1D to 1:0.8:1:1. When receiving the throttling mode change notification from the device 1A, for example, the job assigning unit 22 changes the job assignment ratio to the individual devices 1A to 1D to 0.6:1:1:1 for the performance of the device 1A in throttling mode is 60%. If absolute values of the performances of the devices 1A to 1D in low-power mode and throttling mode are stored in the performance table storage unit 21, relative values of the performances in low-power mode and throttling mode with respect to the performance in normal mode should be acquired based on the absolute values of the performances of the devices 1A to 1D in normal mode.

Thereafter, upon reception of the normal mode change notification or the low-power mode fixation release notification, the job assigning unit 22 returns to the state Q71 and evenly dispatches jobs to the devices 1A to 1D.

[General Operation of Power Control System]

Figure 8:
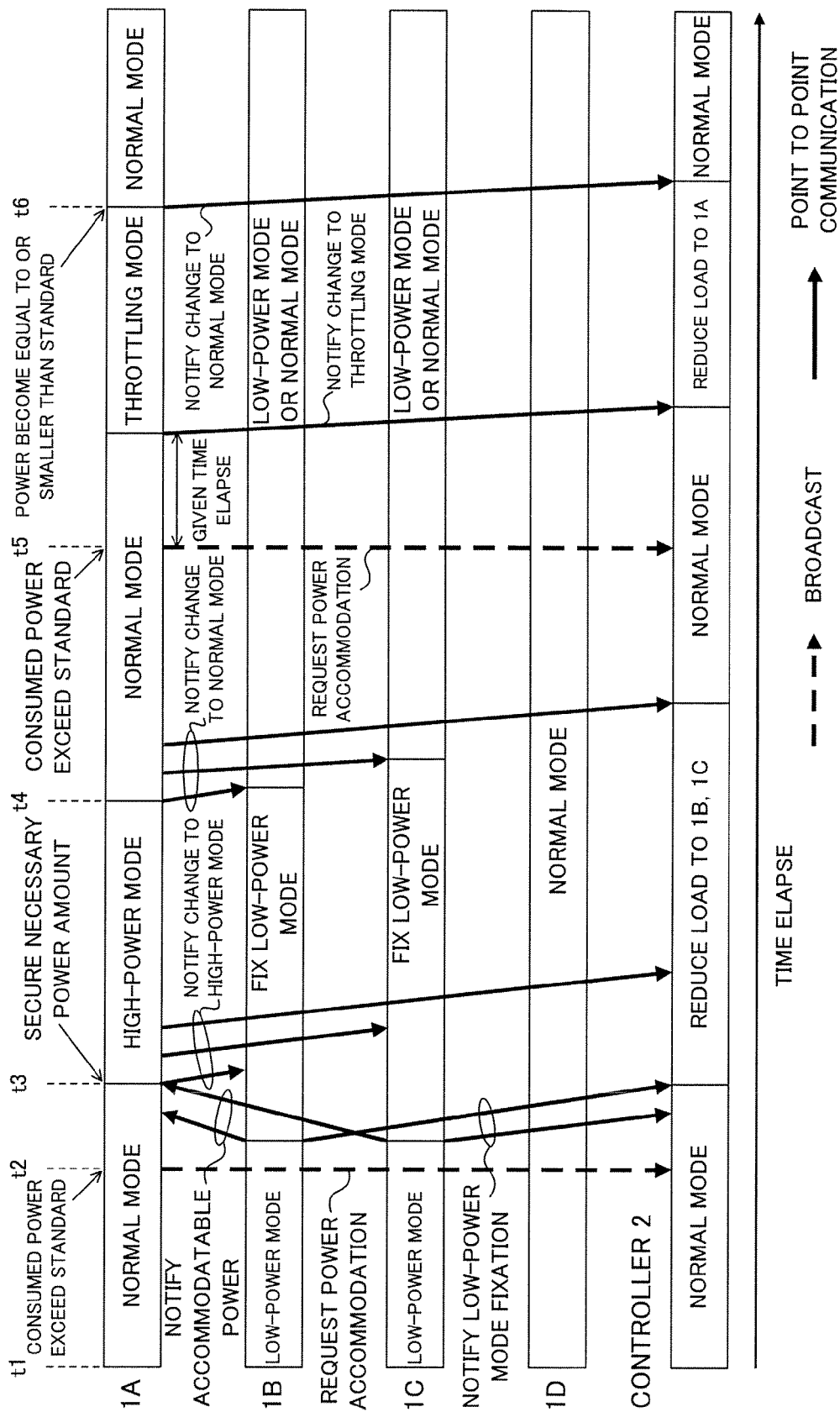
FIG. 8 is a diagram for explaining the general operation of the power control system according to the first embodiment.

Next, the general operation of the power control system will be described referring to FIG. 8.

Suppose that at time t1, the devices 1A and 1D are operating in normal mode, while the devices 1B and 1C are operating in low-power mode.

When the load of the device 1A operating in normal mode increases thereafter and the consumed power measured by the power monitor unit 111 continuously becomes equal to or greater than the standard power value WT for the given time T1 (time t2), the device 1A broadcasts the power accommodation request.

When the device 1B operating in low-power mode receives the power accommodation request, the local device 1B fixes its operational mode to the low-power mode, sends the low-power mode fixation notification to the controller 2, and sends the accommodatable power value notification including an accommodatable power value Wfb to the device 1A which has sent the power accommodation request. Likewise, when the device 1C operating in low-power mode receives the power accommodation request, the local device 1C fixes its operational mode to the low-power mode, sends the low-power mode fixation notification to the controller 2, and sends the accommodatable power value notification including an accommodatable power value Wfc to the device 1A which has sent the power accommodation request. The accommodatable power values Wfb, Wfc respectively indicate the accommodatable power values of the devices 1B, 1C. Upon reception of the low-power mode fixation notifications from the devices 1B, 1C, the controller 2 reduces the job assignment ratio to the devices 1B, 1C according to the contents stored in the performance table storage unit 21. If the contents stored in the performance table storage unit 21 are what is shown in FIG. 4, for example, the controller 2 sets the job assignment ratio to the individual devices 1A to 1D to 1:0.8:0.3:1 according to the performances of the devices.

When the device 1A determines at time t3 (time before the given time T2 elapses from time t2) that the sum of the accommodated powers (Wfb+Wfc) becomes equal to or greater than the needed power value Wneed of the local device 1A based on the accommodatable power value notifications given from the devices 1B, 1C, the device 1A changes the operational mode of the local device 1A to the high-power mode, and sends the high-power mode change notification to the devices 1B, 1C which have accommodated the power, and the controller 2. When the power value accommodated by the device 1B alone exceeds the needed power value Wneed, the device 1A sends the high-power mode change notification only to the device 1B and the controller 2, and does not send the high-power mode change notification to the device 1C. The device 1C, which has been unable to receive the high-power mode change notification even when the given time T3 elapses after transmission of the accommodatable power value notification, releases the fixation of the low-power mode, and sends the low-power mode fixation release notification to the controller 2.

When the load of the device 1A decreases after transition of the operational mode of the device 1A to the high-power mode, and the consumed power of the device 1A continuously becomes less than the standard power value WT for the given time T1 at time t4, the device 1A changes its operational mode to the normal mode and sends the normal mode change notification to the devices 1B, 1C which have accommodated the power, and the controller 2.

Upon reception of the normal mode change notification from the device 1A, the devices 1B, 1C operating in the fixed low-power mode change their operational modes to the normal mode. Thereafter, the devices 1B, 1C change the operational modes according to the loads of the local devices.

Upon reception of the normal mode change notification from the device 1A, the controller 2 terminates the reduction of the job assignment ratio to the individual devices 1B, 1C which have accommodated the power to the device 1A, and evenly dispatches jobs to the individual devices 1A to 1D.

Thereafter, if the device 1A has broadcast the power accommodation request at time t5, but the sum of accommodatable power values has not become equal to or greater than the needed power value Wneed even when the given time T2 has elapsed, the device 1A changes the operational mode to the throttling mode, and sends the throttling mode change notification to the controller 2.

As a result, the controller 2 reduces the job assignment ratio to the device 1A according to the contents stored in the performance table storage unit 21. Assuming now that the contents of the performance table storage unit 21 are what is shown in FIG. 4, the job assignment ratio to the individual devices 1A to 1D is set to 0.6:1:1:1 according to the performances of the devices 1A to 1D. Reducing the job assignment ratio to the device 1A reduces the load of the device 1A, thus lowers the consumed power thereof.

When the consumed power of the device 1A continuously becomes less than the standard power value WT for the given time T4 thereafter (time t6), the device 1A sends the normal mode change notification to the controller 2. Accordingly, the controller 2 terminates the reduction of the job assignment ratio to the device 1A to evenly set the job assignment ratio to the individual devices 1A to 1D.

Effects of First Embodiment

The embodiment can ensure adequate distribution of limited power (maximum suppliable power value Wmax) according to the operational states of the individual devices 1A to 1D while keeping a high reliability. This is because when power becomes short while each of the devices 1A to 1D connected to the network 3 is operating in normal mode, the local device sends the power accommodation request to the other devices, and changes its operational mode to the high-power mode on condition that the sum of accommodatable power values sent from the other devices in response to the power accommodation request is equal to or greater than the needed power value Wneed needed for transition to the high-power mode. When the local device receives the power accommodation request while operating in low-power mode, the local device sends a difference between the mode maximum consumed power value WN in normal mode and the mode maximum consumed power value WL in low-power mode as the accommodatable power value to the device which has sent the power accommodation request.

Because the power accommodation request is broadcasted in the embodiment, it is possible to make the time in which the network 3 is occupied by the power accommodation request shorter as compared with the case where the power accommodation request is sent to each device in point-to-point communication.

Further, according to the embodiment, in a case where the consumed power measured by the power monitor unit 111 continuously becomes equal to or greater than the standard power value WT for the given time T1 while the local device is operating in normal mode, the mode controller 113 determines that the power becomes short. This can allow the mode controller 113 to surely determine that the local device becomes short of power.

Moreover, the embodiment is provided with the controller 2 which dispatches jobs to the individual devices 1A to 1D, and reduces the job assignment ratio to the devices that have accommodated power to other device. This can prevent multiple unprocessed jobs from remaining in a device which has accommodated to other device.

In addition, the controller 2 reduces the job assignment ratio to a device whose operational mode is changed to the throttling mode according to the embodiment, thus making it possible to prevent multiple unprocessed jobs from remaining in that device.

Second Embodiment of the Invention

The second embodiment of the present invention will be described below. The feature of this embodiment lies in that the low-power mode is separated into a plurality of levels.

Figure 9:
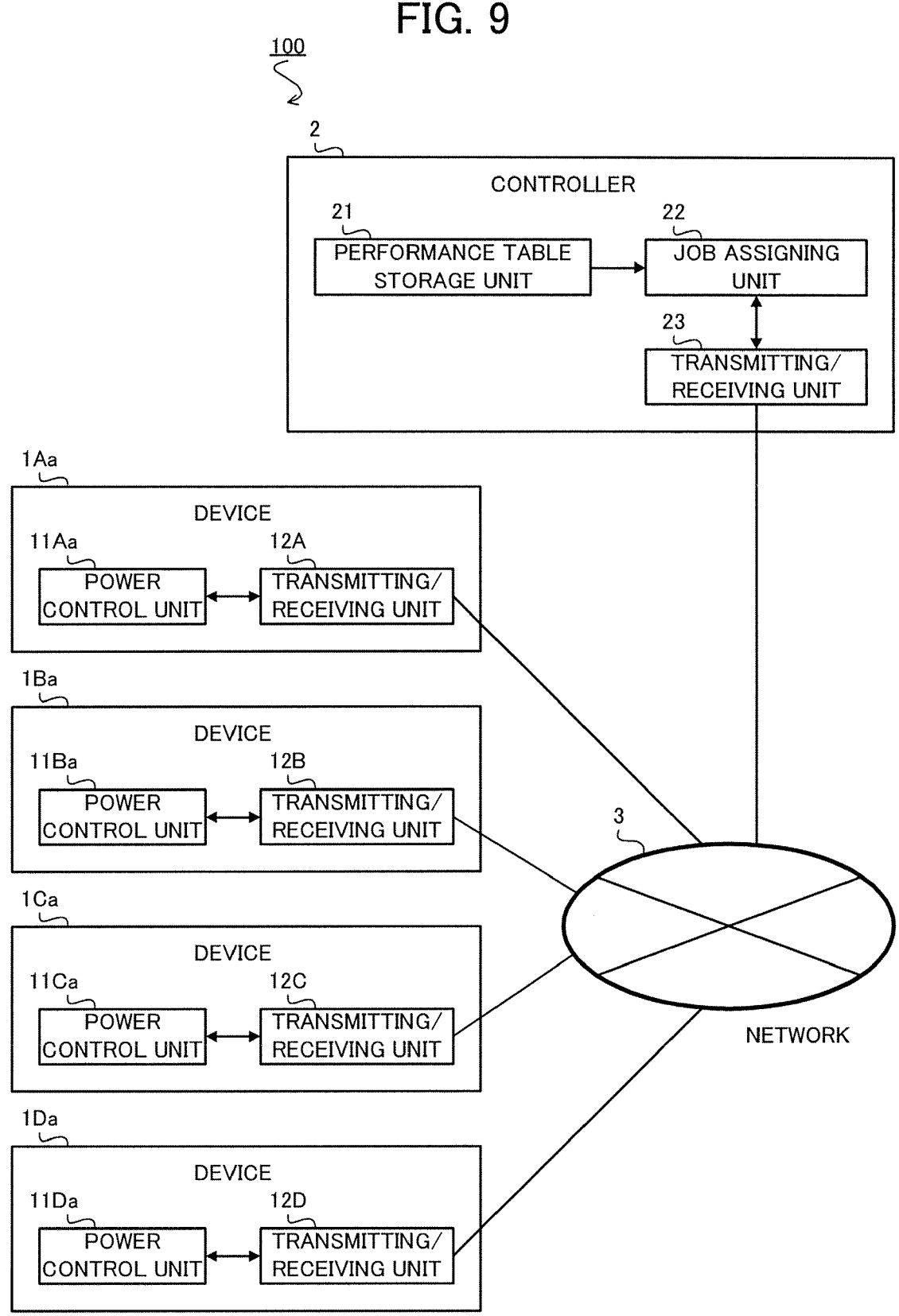
FIG. 9 is a block diagram exemplifying one example of the configuration of a power control system according to a second embodiment.

FIG. 9 is a block diagram exemplifying one example of the configuration of a power control system according to the second embodiment. As shown in FIG. 9, a power control system 100 has a plurality of devices 1Aa to 1Da, and a controller 2, which are connected to one another over a network 3. The devices 1Aa to 1Da respectively have power control units 11Aa to 11Da, and transmitting/receiving units 12A to 12D.

Figure 10:
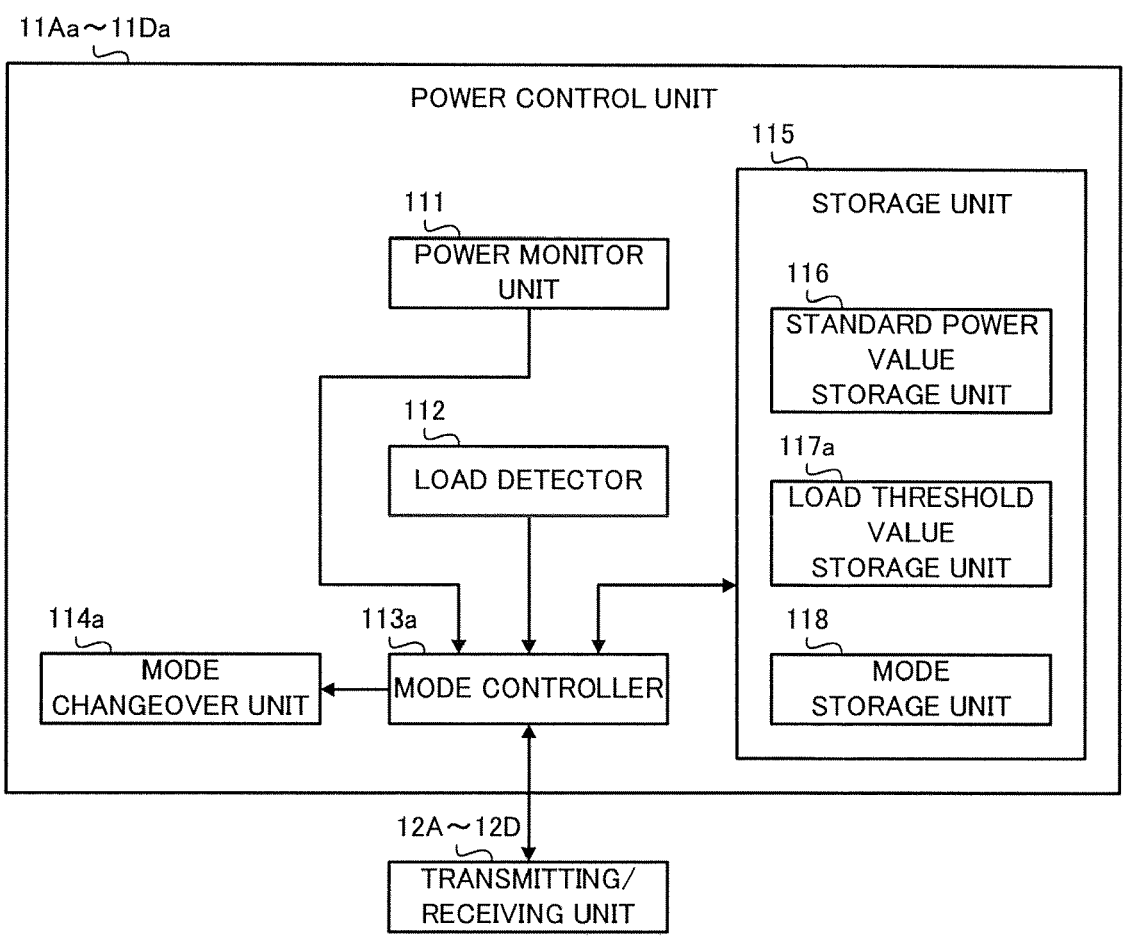
FIG. 10 is a block diagram exemplifying the configuration of a power control unit equipped in a power control system according to a second embodiment.

FIG. 10 shows the configuration of power control units 11Aa to 11Da used in the embodiment.

The power control units 11Aa to 11Da used in the second embodiment differ from the power control units 11A to 11D used in the first embodiment in that each power control unit includes a mode controller 113a, a mode changeover unit 114a and a load threshold value storage unit 117a in place of the mode controller 113, the mode changeover unit 114 and the load threshold value storage unit 117.

Figure 11:
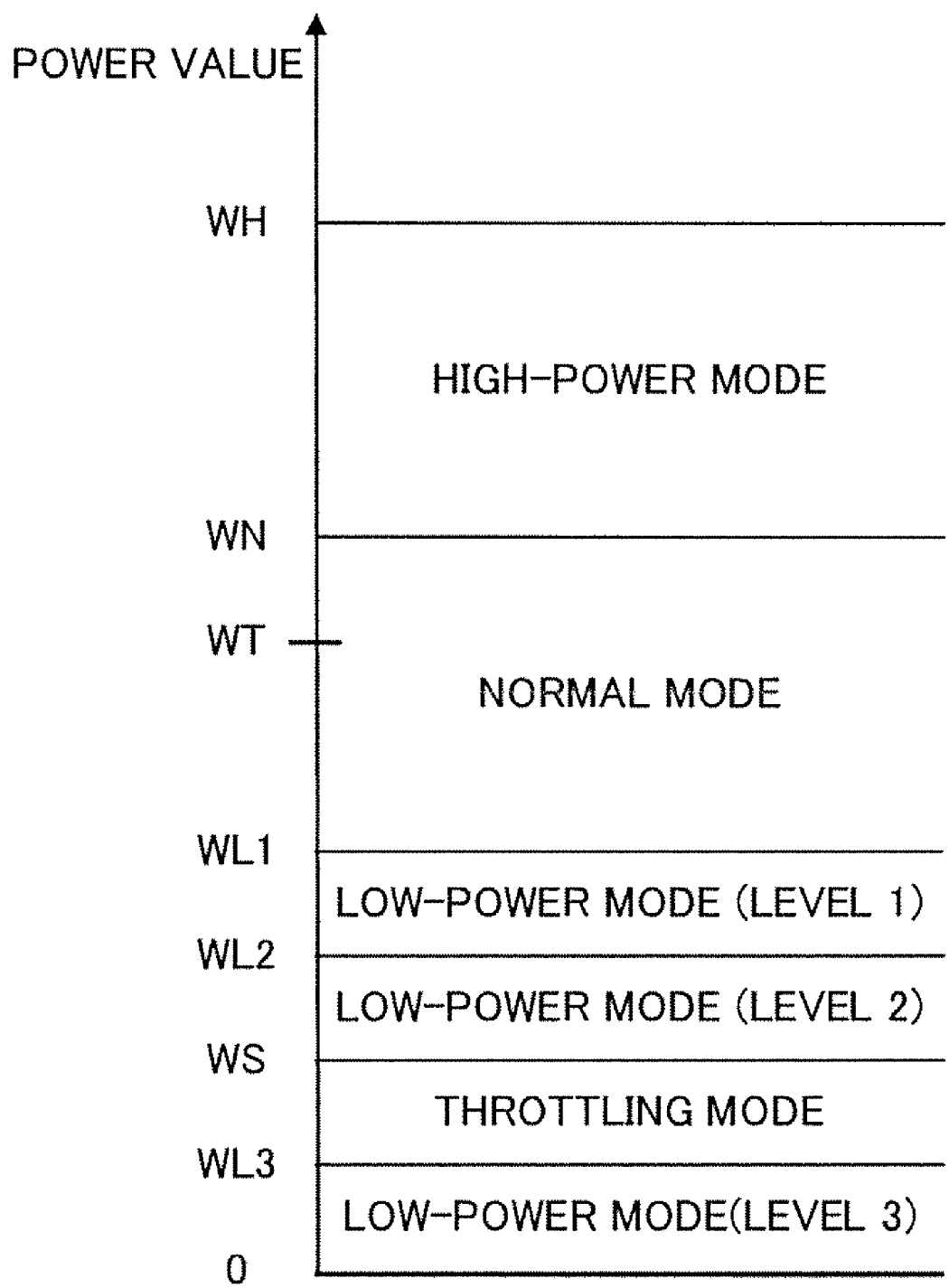
FIG. 11 is a diagram showing the relationship between an operational mode and a mode maximum consumed power value in the power control system according to the second embodiment.

Each of the power control units 11Aa to 11Da in the embodiment has a function of changing the operational mode of the respective one of devices 1Aa to 1Da to one of the low-power mode (three levels 1 to 3), the normal mode, the high-power mode or the throttling mode. The power control units 11Aa to 11Da change the operational mode at the timing when a power accommodation request is received, from other device, at the time when the amount of the loads of the local devices 1Aa to 1Da are changed, or at the timing when the amount of the consumed powers of the local devices 1Aa to 1Da are changed. The power control units 11Aa to 11Da change the operational mode based on, for example, the amount of the loads of the local devices 1Aa to 1Da and the amount of the consumed powers of the local devices 1Aa to 1Da. The individual operational modes differ in the maximum consumed power value available (mode maximum consumed power value). Specifically, as shown in FIG. 11, the mode maximum consumed power value WH for the high-power mode is the largest, followed by the mode maximum consumed power value WN for the normal mode, a mode maximum consumed power value WL1 with the level 1 in low-power mode (which may simply called level 1), a mode maximum consumed power value WL2 with the level 2 in low-power mode (which may simply called level 2), the mode maximum consumed power value WS for the throttling mode, and a mode maximum consumed power value WL3 with the level 3 in low-power mode (which may simply called level 3) in order. According to the embodiment, the sum of the mode maximum consumed power values of the individual devices 1Aa to 1Da in normal mode also matches with the maximum suppliable power value Wmax.

A first threshold value TH1 which is referred to at the time of changing between the normal mode and the level 1, a second threshold value TH2 which is referred to at the time of changing between the level 1 and the level 2, and a third threshold value TH3 which is referred to at the time of changing between the level 2 and the level 3 are stored in the load threshold value storage unit 117a.

The mode changeover unit 114a has a function of changing the operational mode of the local devices 1Aa to 1Da to the high-power mode, the normal mode, the level 1, the level 2, the level 3 or the throttling mode according to an instruction from the mode controller 113a.

The mode controller 113a executes the operational mode change (normal mode, level 1, level 2, or level 3) according to a result detected by the load detector 112 and the first to third threshold values TH1 to TH3 stored in the load threshold value storage unit 117a. When the load detected by the load detector 112 becomes less than the first threshold value with the operational mode of the local device being the normal mode, for example, the mode controller 113a changes the mode information stored in the mode storage unit 118 to one indicating the level 1, and instructs the mode changeover unit 114a to change the operational mode to the level 1. When the load detected by the load detector 112 becomes equal to or greater than the third threshold value with the operational mode of the local device being the level 3, for example, the mode controller 113a changes the mode information stored in the mode storage unit 118 to one indicating the level 2, and instructs the mode changeover unit 114a to change the operational mode to the level 2.

When receiving the power accommodation request while the operational mode of the local device is the low-power mode (level 1, level 2 or level 3), the mode controller 113a fixes the operational mode to the present level, sends the accommodatable power value notification including the accommodatable power value Wf to the requesting device, and sends the low-power mode fixation notification indicating the fixed level to the controller 2. If the present operational mode is the level 2, for example, the mode controller 113a changes the mode information stored in the mode storage unit 118 to one indicating fixation to the level 2, sends the accommodatable power value notification including information showing the (maximum consumed power value WN in normal mode minus maximum consumed power value WL2 of the level 2) as the accommdatable power value Wf to the requesting device, and further sends the low-power mode fixation notification indicating fixation to the level 2 to the controller 2.

FIG. 12 is a diagram showing one example of contents stored in a performance table storage unit 21a which is used in this embodiment in place of the performance table storage unit 21. The performance table storage unit 21a stores the performances of the individual devices 1Aa to 1Da in level 1 to level 3, and in throttling mode in the form of relative values to the 100% performance in normal mode. The rows relating to the device 1Aa in the example shown in FIG. 12 indicate that the performances in level 1 to level 3 are respectively 90%, 60% and 30% of the performance of the device 1Aa in normal mode, and the performance in throttling mode is 50% of the performance in throttling mode.

Description of Operation of Second Embodiment

The operation of the second embodiment will be described next referring to FIG. 8. The following will discuss only the differences from the first embodiment.

Suppose that at time t1, the devices 1Aa, 1Da are operating in normal mode, the device 1Ba operating in the level 1 of the low-power mode and the device 1Ca operating in the level 2 of the low-power mode.

When the device 1Aa broadcasts the power accommodation request at time t2, the devices 1Ba, 1Ca operating in levels 1 and 2 of the low-power mode perform the following operation.

The mode controller 113a in the device 1Ba operating in the level 1 of the low-power mode changes the mode information stored in the mode storage unit 118 to one indicating fixation to the level 1, sends the low-power mode fixation notification indicating that the operational mode is fixed to the level 1 to the controller 2, and further sends the accommodatable power value notification including (mode maximum consumed power value WN in normal mode minus mode maximum consumed power value WL1 in the level 1) as the accommodatable power value Wf to the requesting device 1Aa. The power values WN, WL1 are unique values of the device 1Aa.

Meanwhile, the mode controller 113a in the device 1Ca operating in the level 2 of the low-power mode changes the mode information stored in the mode storage unit 118 to one indicating fixation to the level 2, sends the low-power mode fixation notification indicating that the operational mode is fixed to the level 2 to the controller 2, and further sends the accommodatable power value notification including the (mode maximum consumed power value WN in normal mode minus the mode maximum consumed power value WL2 in the level 2) as the accommodatable power value Wf to the requesting device. The power values WN, WL2 are unique values of the device 1Ca.

When the low-power mode fixation notifications indicating the fixation to the levels 1, 2 are sent from the devices 1Ba, 1Ca respectively, the job assigning unit 22 in the controller 2 acquires the performances of the devices 1Ba, 1Ca in levels 1, 2 from the performance table storage unit 21a, and reduces the job assignment ratio to the devices 1Ba, 1Ca according to the acquired performances. If the performance of the device 1Ba in level 1 is 80% of the performance in the normal mode and the performance of the device 1Ca in the level 2 is 50% of the performance in normal mode, for example, the job assigning unit 22 changes the job assignment ratio to the individual devices 1Aa to 1Da to 1:0.8:0.5:1.

Effects of Second Embodiment

Because the low-power mode is separated into a plurality of levels with different maximum consumed power values, the second embodiment can allow more adequate power accommodation among the individual devices as compared with the first embodiment.

According to the present invention, as described above, it is possible to adequately distribute limited power according to the operational states of the individual devices while keeping a high reliability.

The present invention is preferably adapted to a computer system which has a plurality of computers connected together over a network.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-304360 filed on Nov. 26, 2007 and including specification, claims, drawings and summary. The disclosure of the above Japanese Patent Application is incorporated herein by reference in its entirety.

What is claimed is:

1. A power control system for a network system in which a plurality of devices are connected over a network, each of the plurality of devices including:
   a mode changeover unit that operates a local device in one of a plurality of modes specified by a mode changeover instruction, the plurality of modes including a low-power mode, a normal mode having a maximum consumed power value greater than a maximum consumed power value in the low-power mode, and a high-power mode having a maximum consumed power value greater than the maximum consumed power value in the normal mode; and
   a mode controller that
      sends a first power accommodation request to other devices in case of determining that power becomes insufficient when the local device is operating in the normal mode,
      outputs a mode changeover instruction instructing an operation in the high-power mode to the mode changeover unit in case of determining that a total of accommodatable power values sent from the other devices in response to the power accommodation request is equal to or greater than a needed power value needed for transition to the high-power mode, and
      sends a difference between the maximum consumed power value in the normal mode and the maximum consumed power value in the low-power mode as an accommodatable power value to a sender device which has sent a second power accommodation request in case of receiving the second power accommodation request when the local device is operating in the low-power mode,
   wherein a total of the maximum consumed power values of the individual devices in the normal mode matches with a maximum suppliable power value suppliable to the network system.

2. The power control system according to claim 1, wherein the mode controller broadcasts the power accommodation request.

3. The power control system according to claim 1, wherein each of the plurality of devices further includes:
   a power monitor unit that measures a consumed power of the local device; and
   a standard power value storage unit storing a standard power value smaller than the maximum consumed power value in the normal mode and greater than the maximum consumed power value in the low-power mode, and
   the mode controller determines that power is insufficient in case of determining that the consumed power measured by the power monitor unit becomes equal to or greater than the standard power value stored in the standard power value storage unit, continuously for a given time when the local device is operating in the normal mode.

4. The power control system according to claim 1, wherein the low-power mode is separated into a plurality of levels whose maximum consumed power values differ from one another,
   when a level of the low-power mode is specified by the mode changeover instruction, the mode changeover unit operates the local device in the specified level, and
   upon reception of the power accommodation request when the local device is operating in one of the levels of the low-power mode, the mode controller sends a difference between the maximum consumed power value in the normal mode and the maximum consumed power value in the current operation level as an accommodatable power value to the sender device.

5. The power control system according to claim 1, further including a controller that dispatches a job to each of the devices, and reduces a job assignment ratio of that device which has accommodated power to other device,
   wherein when a throttling mode is specified by the mode changeover instruction, the mode changeover unit operates the local device in the throttling mode having a maximum consumed power value smaller than the maximum consumed power value in the normal mode;
   when determining that the total of accommodatable power values sent from the other deices in response to the power accommodation request does not reach the needed power value, the mode controller sends a mode changeover instruction instructing an operation in the throttling mode to the mode changeover unit, and
   the controller reduces the job assignment ration of the device which has shifted to the throttling mode.

6. A power control apparatus provided in each of a plurality of devices which are connected over a network, including:
   a mode changeover unit that operates a local device in one of a plurality of modes specified by a mode changeover instruction, the plurality of modes including a low-power mode, a normal mode having a maximum consumed power value greater than a maximum consumed power value in the low-power mode, and a high-power mode having a maximum consumed power value greater than the maximum consumed power value in the normal mode; and
   a mode controller that
      sends a first power accommodation request to other devices in case of determining that power becomes insufficient when the local device is operating in the normal mode,
      outputs a mode changeover instruction instructing an operation in the high-power mode to the mode changeover unit in case of determining that a total of accommodatable power values sent from the other devices in response to the power accommodation request is equal to or greater than a needed power value needed for transition to the high-power mode, and
      sends a difference between the maximum consumed power value in the normal mode and the maximum consumed power value in the low-power mode as an accommodatable power value to a sender device which has sent a second power accommodation request in case of receiving the second power accommodation request when the local device is operating in the low-power mode, wherein a total of the maximum consumed power values of the individual devices in the normal mode matches with a maximum suppliable power value suppliable to the network system.

7. The power control apparatus according to claim 6, further including:
a power monitor unit that measures a consumed power of the local device; and
a standard power value storage unit storing a standard power value smaller than the maximum consumed power value in the normal mode and greater than the maximum consumed power value in the low-power mode,
wherein the mode controller determines that power is insufficient in case of determining that the consumed power measured by the power monitor unit becomes equal to or greater than the standard power value stored in the standard power value storage unit, continuously for a given time when the local device is operating in the normal mode.

8. The power control apparatus according to claim 6, wherein the low-power mode is separated into a plurality of levels whose maximum consumed power values differ from one another,
when a level of the low-power mode is specified by the mode changeover instruction, the mode changeover unit operates the local device in the specified level, and
upon reception of the power accommodation request when the local device is operating in one of the levels of the low-power mode, the mode controller sends a difference between the maximum consumed power value in the normal mode and the maximum consumed power value in the current operation level as an accommodatable power value to the sender device.

9. A power control method for a network system in which a plurality of devices are connected over a network, including:
a mode changeover step of allowing each of the plurality of devices to operate a local device in one of a plurality of modes specified by a mode changeover instruction, the plurality of modes including a low-power mode, a normal mode having a maximum consumed power value greater than a maximum consumed power value in the low-power mode, and a high-power mode having a maximum consumed power value greater than a maximum consumed power value in the normal mode; and
a mode control step of allowing each of the plurality of devices to
send a power accommodation request to other devices in case of determining that power becomes insufficient when the local device is operating in the normal mode,
output a mode changeover instruction instructing an operation in the high-power mode to the mode changeover step in case of determining that a total of accommodatable power values sent from the other devices in response to the power accommodation request is equal to or greater than a needed power value needed for transition to the high-power mode, and
send a difference between the maximum consumed power value in the normal mode and the maximum consumed power value in the low-power mode as an accommodatable power value to a sender device which has sent the power accommodation request in case of receiving the power accommodation request when the local device is operating in the low-power mode,
wherein a total of the maximum consumed power values of the individual devices in the normal mode matches with a maximum suppliable power value suppliable to the network system.

10. The power control method according to claim 9, wherein the power accommodation request is broadcasted in the mode control step.

11. The power control method according to claim 9, wherein each of the plurality of devices further includes:
a power monitor unit that measures a consumed power of the local device; and
a standard power value storage unit storing a standard power value smaller than the maximum consumed power value in the normal mode and greater than the maximum consumed power value in the low-power mode, and
in the mode control step, it is determined that power is insufficient in case of determining that the consumed power measured by the power monitor unit becomes equal to or greater than the standard power value stored in the standard power value storage unit, continuously for a given time when the local device is operating in the normal mode.

12. The power control method according to claim 9, wherein the low-power mode is separated into a plurality of levels whose maximum consumed power values differ from one another,
when a level of the low-power mode is specified by the mode changeover instruction, the local device is operated in the specified level in the mode changeover step, and
in the mode control step, in case where the local device receives the power accommodation request when operating in one of the levels of the low-power mode, a difference between the maximum consumed power value in the normal mode and the maximum consumed power value in the current operation level is sent as an accommodatable power value to the sender device.

13. The power control method according to claim 9, further including a job assigning step in which a controller that dispatches a job to each of the plurality of devices reduces a job assignment ratio of that device which has accommodated power to another device,
wherein in the mode changeover step, when a throttling mode is specified by the mode changeover instruction, the local device is operated in the throttling mode whose maximum consumed power value is smaller than the maximum consumed power value in the normal mode,
in the mode control step, when determining that the total of accommodatable power values sent from the other devices in response to the power accommodation request does not reach the needed power value, a mode changeover instruction instructing an operation in the throttling mode is sent to the mode changeover unit; and
in the job assigning step, the job assignment ratio of that device which has shifted to the throttling mode is reduced.

14. A computer-readable storage medium storing a program for allowing a computer to realize a power control apparatus provided in each of a plurality of devices which are connected over a network, the computer being allowed to function as:
a mode changeover unit that operates a local device in one of a plurality of modes specified by a mode changeover instruction, the plurality of modes including a low-power mode, a normal mode having a maximum consumed power value greater than a maximum consumed power value in the low-power mode, and a high-power mode having a maximum consumed power value greater than the maximum consumed power value in the normal mode; and a mode controller that sends a first power accommodation request to other devices in case of determining that power becomes insufficient when the local device is operating in the normal mode, outputs a mode changeover instruction instructing an operation in the high-power mode to the mode changeover unit in case of determining that a total of accommodatable power values sent from the other devices in response to the power accommodation request is equal to or greater than a needed power value needed for transition to the high-power mode, and sends a difference between the maximum consumed power value in the normal mode and the maximum consumed power value in the low-power mode as an accommodatable power value to a sender device which has sent a second power accommodation request in case of receiving the second power accommodation request when the local device is operating in the low-power mode, wherein a total of the maximum consumed power values of the individual devices in the normal mode matches with a maximum suppliable power value suppliable to the network system.

15. The computer-readable storage medium according to claim 14, wherein each of the plurality of devices includes:

a power monitor unit that measures a consumed power of the local device; and a standard power value storage unit storing a standard power value smaller than the maximum consumed power value in the normal mode and greater than the maximum consumed power value in the low-power mode, and the mode controller determines that power is insufficient in case of determining that the consumed power measured by the power monitor unit becomes equal to or greater than the standard power value stored in the standard power value storage unit, continuously for a given time when the local device is operating in the normal mode.

16. The computer-readable storage medium according to claim 14, wherein the low-power mode is separated into a plurality of levels whose maximum consumed power values differ from one another, when a level of the low-power mode is specified by the mode changeover instruction, the mode changeover unit operates the local device in the specified level, and upon reception of the power accommodation request when the local device is operating in one of the levels of the low-power mode, the mode controller sends a difference between the maximum consumed power value in the normal mode and the maximum consumed power value in the current operation level as an accommodatable power value to the sender device.

\* \* \* \* \*